(12) United States Patent
Hamm

(10) Patent No.: US 8,517,043 B2
(45) Date of Patent: Aug. 27, 2013

(54) PRESSURE BUILD ECONOMIZER VALVE

(75) Inventor: Mark K Hamm, Cullman, AL (US)

(73) Assignee: Pentair Valves & Controls US LP, Golden Valley, MN (US)

( * ) Notice: Subject to any disclaimer, the term of this patent is extended or adjusted under 35 U.S.C. 154(b) by 309 days.

(21) Appl. No.: 12/942,743

(22) Filed: Nov. 9, 2010

(65) Prior Publication Data
US 2011/0108751 A1    May 12, 2011

Related U.S. Application Data

(60) Provisional application No. 61/259,726, filed on Nov. 10, 2009, provisional application No. 61/320,817, filed on Apr. 5, 2010.

(51) Int. Cl.
*G05D 9/00* (2006.01)

(52) U.S. Cl.
USPC .................................................. 137/118.06

(58) Field of Classification Search
USPC ............... 137/115.14, 115.15, 116.3, 116.5, 137/210, 211.5, 505.11, 505.22, 505.25, 137/505.28, 505.26, 505.27, 505.42, 505, 137/536, 209, 212; 62/50.1, 50.7
See application file for complete search history.

(56) References Cited

U.S. PATENT DOCUMENTS

| | | | | |
|---|---|---|---|---|
| 1,595,809 A * | 8/1926 | Nichols | | 137/116.5 |
| 2,783,769 A * | 3/1957 | Philbrick | | 137/116.5 |
| 3,926,208 A * | 12/1975 | Hoffman | | 137/484.8 |
| 3,991,783 A * | 11/1976 | Krauss | | 137/209 |
| 4,624,277 A * | 11/1986 | Veite | | 137/116.3 |
| 5,136,852 A * | 8/1992 | Neeser et al. | | 62/50.4 |
| 5,247,959 A * | 9/1993 | Fretwell | | 137/116.3 |
| 7,021,333 B1 | 4/2006 | Gill | | |
| 2002/0153041 A1* | 10/2002 | Drube et al. | | 137/208 |
| 2004/0129906 A1 | 7/2004 | Authelet et al. | | |
| 2006/0108550 A1 | 5/2006 | Burmester | | |
| 2007/0028628 A1 | 2/2007 | Chalk et al. | | |

* cited by examiner

Primary Examiner — Stephen M Hepperle
Assistant Examiner — R. K. Arundale
(74) Attorney, Agent, or Firm — Quarles & Brady LLP

(57) ABSTRACT

An adjustable economizer valve is disclosed that does not overlap the pressure build function, which allows a single valve to be used for both high and low gas use applications. The valve will economize well and reduces system pressure when needed in low use applications. The valve also provides maximum pressure build capacity when needed in high gas use applications. The valve seals off the pressure build outlet from the economizer connection with a seal around a pusher post disposed in the valve body. The pusher post has an internal flow path that is sealed by a floating device that can create a seal from diaphragm pressure and can open when diaphragm pressure is removed. In exemplary, non-limiting, embodiments, the floating device can be a ball or a disc plate.

18 Claims, 8 Drawing Sheets

PRESSURE BUILD ECONOMIZER VALVE

CROSS-REFERENCE TO RELATED APPLICATIONS

This is a non-provisional of U.S. provisional patent application Ser. No. 61/320,817, filed Apr. 5, 2010, and is also a non-provisional of U.S. provisional patent application Ser. No. 61/259,726, filed Nov. 10, 2009, the entirety of which provisional applications are expressly incorporated herein by reference.

BACKGROUND OF THE INVENTION

1. Field of the Invention

Embodiments of the invention generally relate to the field of economizer valves, and more particularly to a pressure build economizer valve that opens based on increasing system pressure and does not have overlapping pressure build and economizer functions.

2. Discussion of Related Art

Economizer valves are used in industrial applications for pressure regulation in cryogenic liquid and gas supply systems. Pressure build economizer (PBE) valves combine pressure building and economizer functions into one unit. Existing PBE valves for cryogenic liquid cylinders and bulk tanks are based on three types of designs. The three types include: (1) an active economizer that overlaps the pressure build function, (2) an inactive orifice economizer function, and (3) an active economizer that flows through the pressure build shutoff piston. Existing PBE valves with active economizers that overlap the pressure build function undesirably reduce the pressure build capacity of the system until the cylinder pressure has dropped below normal operating pressures. Existing inactive economizer functions have a fixed orifice economizer such that the economizer function is always open, undesirably limiting the capacity of the pressure build function or the economizer orifice is too small to give adequate pressure reduction within a reasonable period of time. Existing PBE valves with active economizer functions that flow through the piston are costly to manufacture and also have a potential problem of leakage between the pressure build and economizer functions that can create runaway cylinder pressure.

It would, therefore, be an advantage to provide a cost effective economizer valve for cryogenic liquid cylinders that has an active economizer that opens based on increasing system pressure and does not have overlapping pressure build and economizer functions.

SUMMARY OF THE INVENTION

An adjustable economizer valve is disclosed that does not overlap the pressure build function and is not restricted to a small orifice, thus allowing the same valve to be used for both high and low gas use applications. The valve will economize well and reduce system pressure when needed in low gas use applications. It will also provide maximum pressure build capacity when needed in high gas use applications.

The disclosed valve seals off the pressure build outlet from the economizer connection with a seal around a pusher post disposed in the valve body. The pusher post has an internal flow path that is sealed by a floating device that can create a seal from diaphragm pressure and open when diaphragm pressure is removed. In exemplary, non-limiting, embodiments, the floating device can be a ball or a disc plate.

A valve is disclosed comprising a body having first, second and third ports. A piston pusher and a piston may be included, and the piston pusher may be slidably disposed within a first bore in the body. A first end of the piston pusher may be received by the piston, and the piston may be slidably disposed within a second bore in the body. A second end of the piston pusher may have a pusher recess comprising a side bore permitting media communication between the pusher recess and the vertically oriented bore. The piston further may include a disc member positioned opposite a seat region in the body. The valve may further include a seal member that is selectively engageable with the pusher recess. The valve may have a bonnet connected to the body. The bonnet may have a diaphragm with a bottom face presented to an upper surface of the seal member.

A valve is disclosed, comprising a body having first, second and third ports, a piston pusher and a piston. The piston pusher may be slidably disposed within a first bore in the body. A first end of the piston pusher may be received by the piston, and a second end of the piston pusher may have a pusher recess comprising a side bore permitting media communication between the pusher recess and the vertically oriented bore. The piston may be slidably disposed within a second bore in the body. The piston may further include a disc member positioned opposite a seat region in the body. The valve may also include a bonnet assembly including a spring-biased diaphragm, and a seal member having first and second surfaces, where the first surface is selectively engageable with the pusher recess, and the second surface is selectively engageable with the diaphragm.

A valve is disclosed, comprising a body having first, second and third ports, a piston pusher and a piston. The piston pusher may be slidably disposed within a first bore in the body. A first end of the piston pusher may be received by the piston. The piston may be slidably disposed within a second bore in the body. A second end of the piston pusher may have a pusher recess engaging a seal member. The piston pusher recess may further comprise a side bore permitting media communication between the pusher recess and the vertically oriented bore. The piston may further include a disc member positioned opposite a seat region in the body. The valve may further include a bonnet connected to the body, the bonnet having a diaphragm such that a bottom face of the diaphragm is presented to an upper surface of the seal member. The diaphragm may be biased toward the seal member by a first spring, and the piston pusher and plate may be biased toward the diaphragm by a second spring. The valve may have first and second configurations for enabling selective flow between the first, second and third ports

BRIEF DESCRIPTION OF THE DRAWINGS

The accompanying drawing illustrates exemplary embodiments of the disclosed device so far devised for the practical application of the principles thereof, and in which.

DESCRIPTION OF EMBODIMENTS

Figure 1:
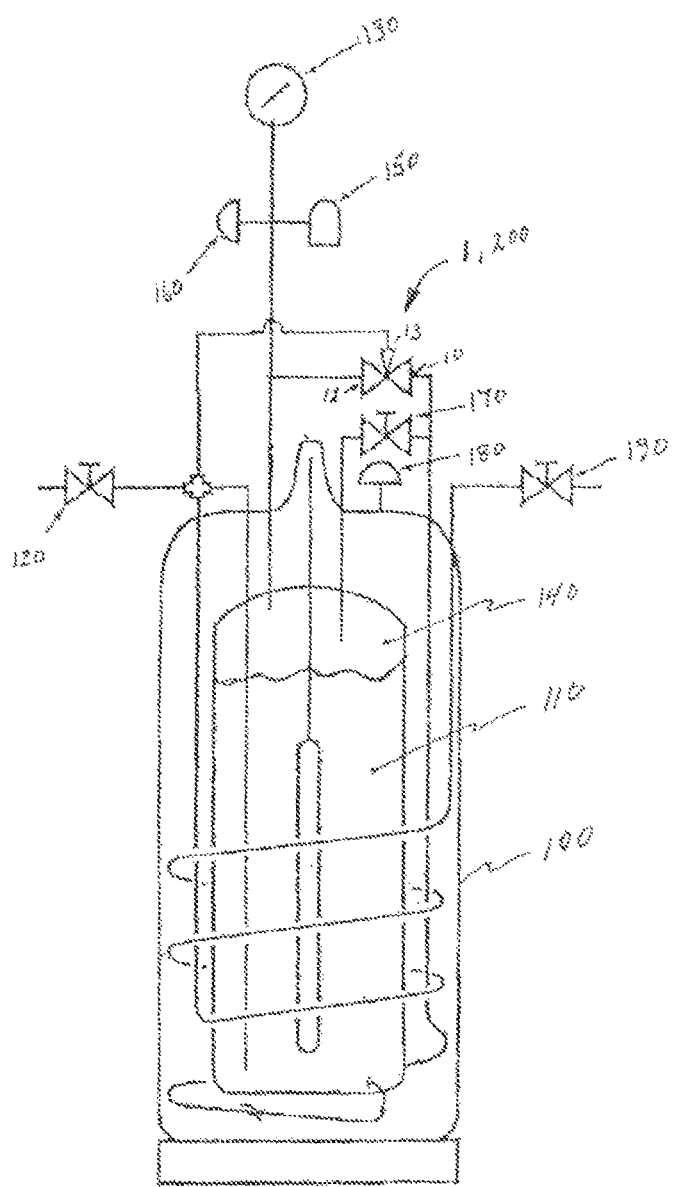
FIG. 1 is a schematic of the disclosed valve in an exemplary cryogenic supply system.

This description is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. Such relative terms are for convenience of description and do not require that the apparatus be constructed or operated in a particular orientation.

Referring to FIG. 1, the disclosed valve 1, 200 may be part of a cryogenic liquid cylinder system used to store and dispense process gases such as oxygen, nitrogen, argon, or carbon dioxide. Such systems can include a cylinder 100 containing a quantity of liquefied gas 110, as well as a variety of tubing system components configured to maintain and dispense gas when required by a user. The tubing system components may include a liquid fill/withdrawal valve 120 for filling and draining the cylinder, a pressure gage 130 for monitoring the pressure of the gas layer 140 above the liquid 110, a pressure relief valve 150 and/or burst disc 160, and a vent valve 170 for venting gas 140 from the top of the cylinder 100, and a vacuum burst disc 180. A gas withdrawal valve 190 is operable by a user to dispense gas. As shown, the disclosed valve 1 may be connected via appropriate tubing to the liquefied gas 110, the gas layer 140, and the gas withdrawal tube connected to the valve 190. In this way, the valve 1, 200 can perform both the pressure building and economizer functions previously described.

Figure 2:
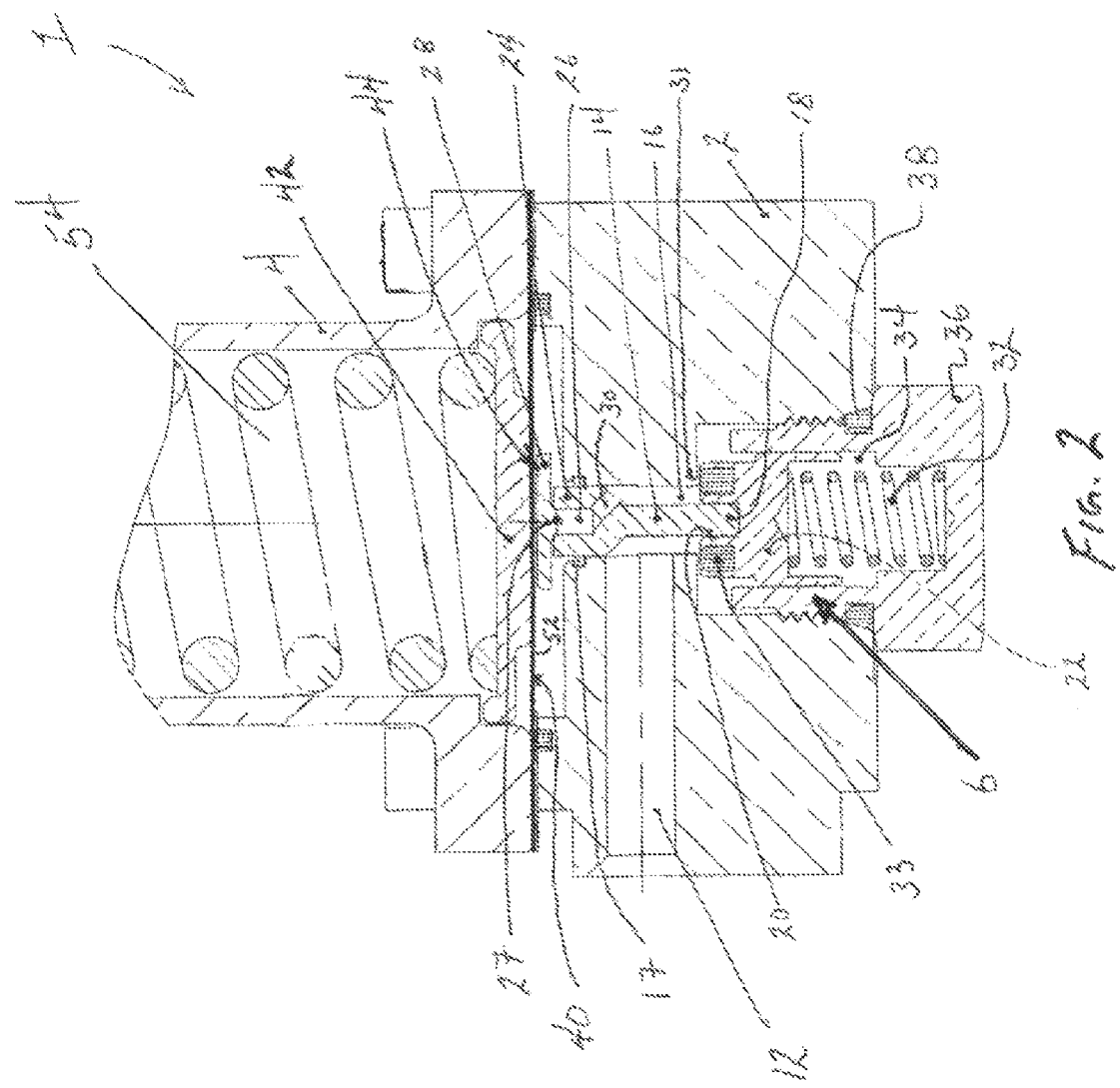
FIG. 2 is a cross-section view of the disclosed valve.
Figure 3:
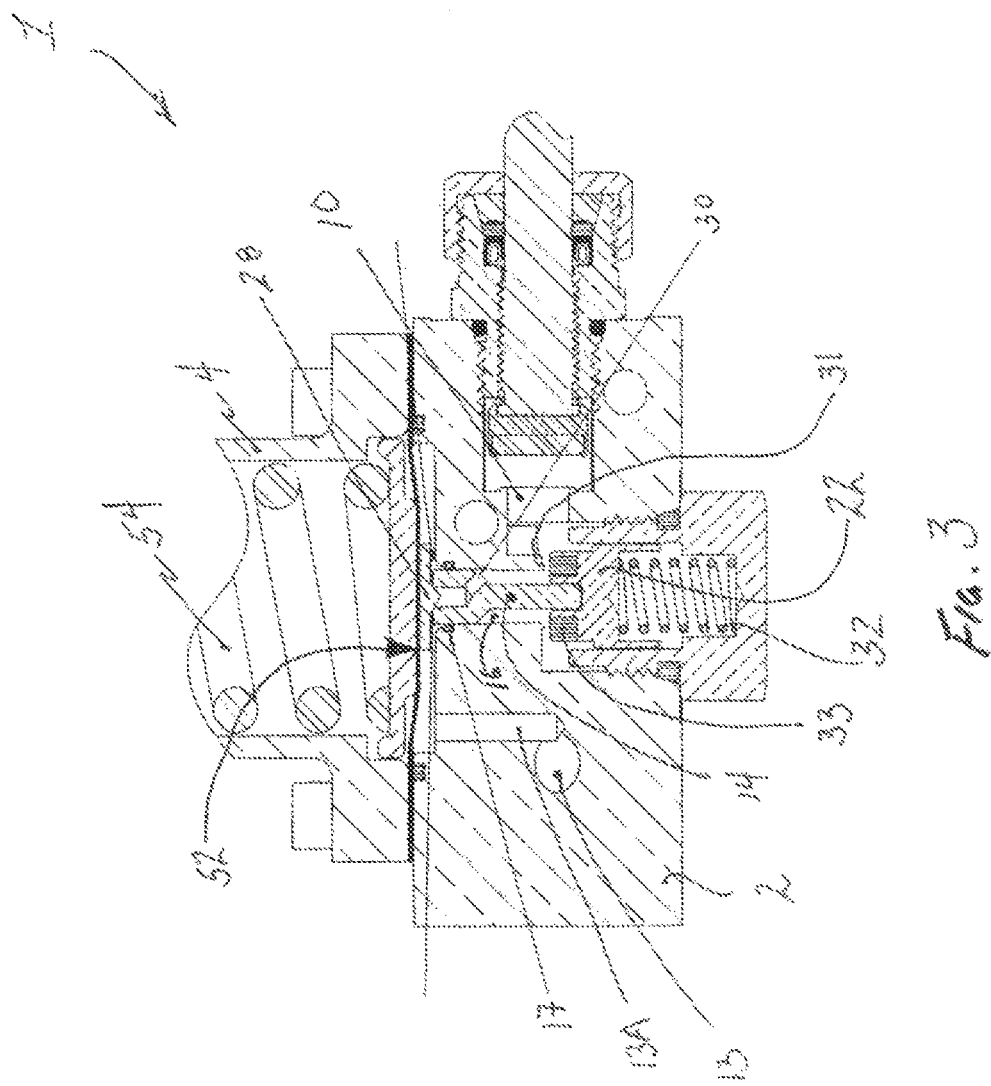
FIG. 3 is a cross-section view of the valve of FIG. 2 illustrating a pressure build operating configuration.
Figure 4:
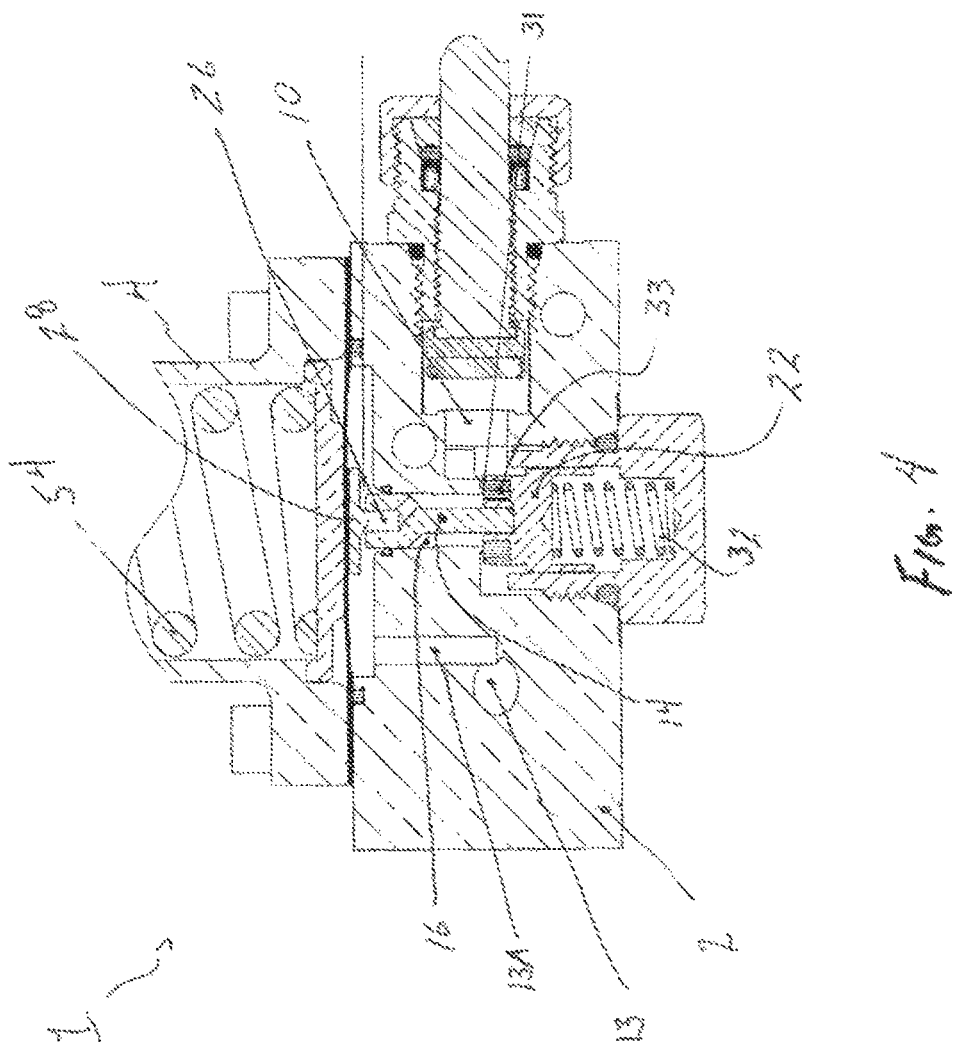
FIG. 4 is a cross section view of the valve of FIG. 2 rotated 90-degrees, illustrating an economizer operating configuration.

Referring now to FIGS. 2-4, an embodiment the disclosed valve 1 comprises a body 2, a bonnet 4, a piston pusher assembly 6 disposed in the body 2, and a diaphragm 40 disposed in the bonnet 4. The body 2 also includes a first port 10 (see FIGS. 3 and 4) connected to the liquid 110 portion of the cylinder 100, a second port 12 (see FIG. 2) connected to the gas layer 140 above the liquid, and a third port 13 (see FIGS. 3 and 4) connected to the gas withdrawal valve 190. The body 2 and bonnet 4 are connected to each other via a bolted connection.

The piston pusher assembly 6 comprises a piston pusher 14 slidably disposed within a vertically oriented bore 16 in the body 2. A first end 18 of the piston pusher 14 is received within a recess 20 in a piston 22, while a second end 24 comprises a pusher recess 26 that engages a seal member 28, which in the illustrated embodiment is a plate member having a projection portion 27 which is at least partially received within the pusher recess 26 to enable a seal to be selectably formed between the two pieces. It will be appreciated that the seal member 28 may take any of a variety of forms, including a flat or curved plate, a ball member, a cylindrical member, and the like.

The pusher recess 26 may further include a side bore 30 to provide media communication between the pusher recess 26 and the vertically oriented bore 16. The piston pusher 14 may be sealed to the bore 16 via an o-ring 17.

The piston 22 and the piston pusher 14 are biased upward toward a seat region 31 of the body 2 via a spring 32 disposed in a spring bore 34 formed in a body plug 36 which itself is threaded into the bottom of the body 2. An annular disc 33 is set into the piston 22 and biased into engagement with the seat region 31 of the body 2 via the force of the spring 32. In one embodiment, the disc 33 is burnished into the piston 22. Thus, in the illustrated configuration, the disc 33 contacts the seat region 31 to seal off the first port 10 from the vertically oriented bore 16 and the second port 12. The body plug 36 is sealed to the body 2 via a seal ring 38.

The diaphragm 40 is sandwiched between opposing surfaces of the body 2 and bonnet 4. In this arrangement, a flat bottom face 52 of the diaphragm 40 is presented to an opposing surface 44 of the seal member 28 which is held by the piston pusher 14 in the manner previously described. In one embodiment, the seal member 28 is a flat plate and the flat bottom face 52 engages the flat top surface of the plate. For embodiments in which the seal member 28 is a ball member, the flat bottom face 52 of the diaphragm 40 may engage the top round surface of the ball member.

The diaphragm plate 42 and diaphragm 40 are biased downward by a spring 54, the compression of which is adjustable via a tension screw (not shown) which is threadably mounted to the top of the bonnet 4. The tension screw engages the spring to control the set point of the valve (i.e., the pressure at which the valve will switch from the pressure build function to the economizer function). An opposite end of the spring 54 bears against an upper surface of a diaphragm plate 42, biasing the diaphragm plate 42 toward the piston pusher 14 and seal member 28.

As noted, the disclosed valve 1 is configured to perform both pressure build and economizer functions. FIGS. 3 and 4 show the internal configuration of the valve when performing each of these functions.

Thus, FIG. 3 shows the valve 1 in the "pressure build" configuration. As can be seen, the force of the spring 54 on the diaphragm plate 42 and diaphragm 40 causes the plate and diaphragm to press down on the seal member 28 and piston pusher 14. This, in turn, presses down on the piston 22 and unseats the disc 33 from the seat region 31. In this configuration, the first and second ports 10, 12 are in media communication via the vertically oriented bore 16 in the body 2. Thus, a path is provided between the liquid 110 and the gas layer 140 of the tank (see FIG. 1). As liquid flows through the system tubing to the tank top, it vaporizes, expanding and building pressure in the top of the tank. This enables the system to maintain a desired gas pressure (sometimes referred to as the "pressure build shutoff pressure") above the liquid in the tank.

This pressure build shutoff pressure may be slightly greater than that of the outlet gas pressure. For example, if it is desired to provide process gas at about 100 psi through the gas withdrawal valve 190, the valve 1 may be set by adjusting the tension screw (not shown) to compress spring 54 so that the pressure build feature allows the gas layer 140 to rise to a pressure build shutoff pressure of about 105 psi. It will be appreciated that these pressure values are merely exemplary and non-limiting, and that the disclosed valve may be used with a variety of other operating and pressure build shutoff pressure values.

When the pressure in the first port 10 and the vertically oriented bore 16 approaches the pressure build shutoff pressure of 105 psi, the force of spring 54 is counteracted by the fluid force acting on the underside of the diaphragm 40 via bore 13A (FIG. 3). As the pressure on the underside of the diaphragm 40 nears 105 psi (again, this value is merely exemplary), the piston pusher 14 rises along with the piston 22 until the disc 33 engages the seat region 31 of the body, shutting off flow between the first port 10 and the second port 12.

If the pressure in the gas layer 140 drops below the pressure build shutoff pressure (e.g., due to substantial gas withdrawal), the force of spring 54 presses the piston 22 and disc 33 downward, unseating the disc 33 from the seat region 31, and enabling flow between the first and second ports 10, 12 to thereby raise the pressure of the gas layer 140 above the liquid 110. This process repeats to maintain the desired pressure above the liquid.

During idle periods where little or no gas is withdrawn via the gas withdrawal valve 190, there may be a tendency for the system pressure to rise above the pressure build shutoff pressure. This rise in system pressure can be caused by, for example, heat transfer from the ambient surroundings that vaporizes small quantities of liquefied gas. When gas is withdrawn from the system under such an "over-pressure" condition, the valve 1 is configured so that gas is initially taken from the gas layer 140 at the top of the cylinder 100 to quickly return the system pressure to at or near the pressure build shutoff pressure. Once the system pressure has been suitably reduced, the economizer function of the valve 1 shuts off and gas is thereafter produced by pulling from the liquid 110 in the cylinder 100.

FIG. 4 shows the valve 1 configured for drawing gas from the gas layer 140 when the system pressure is above the pressure build shutoff pressure. Initially the diaphragm 40 is in the downwardly deflected condition (see FIG. 3), in which the gas pressure beneath the diaphragm 40 is sufficient to compress the spring 54 and enable the seal member 28 to "float" above the piston pusher recess 26. As gas is drawn from the third port 13, gas flows from the second port 12 (again, taking from the gas layer 140 in the cylinder), through the side bore 30 of the piston pusher 14, and through third intermediate port 13A. This occurs until the pressure of gas layer 140 begins to drop due to the withdrawal of gas directly from the gas layer 140. As the pressure of the gas layer drops, the spring 54 begins to move downward which presses the diaphragm 40 against the seal member 28. This, in turn, forces the piston pusher 14 and piston 22 down. Forcing the seal member 28 downward causes the seal member 28 to seal against the piston pusher recess 26 preventing further flow between the second and third ports 12, 13. As such, gas ceases to be drawn directly from the gas layer. It will be appreciated that where the seal member 28 includes a projection portion 27, the projection portion itself may seal against the piston pusher recess.

The described downward movement of the piston pusher 14 and piston 22 also causes the disc 33 to unseat from the seat region 31, reestablishing flow from the first port 10 (which is connected to the liquid 110) to the second port 12 (which is connected to the gas layer 140). In this way, the flow path of the economizer is closed during the pressure build operation when the seal member 28 engages the diaphragm. Economizer flow only occurs when the disc 33 has seated and the diaphragm 40 continues to rise with increased pressure above the pressure build shut off pressure. This eliminates pressure build and economizer function overlap and provides a controlled opening pressure (adjustable active economizer) for the economizer.

The economizer flow initiation set point (which is the same as the pressure build shutoff pressure) is adjustable, and it does not overlap the pressure build function which can reduce the pressure build capacity of the system. The disclosed valve is well suited for both high and low gas usage applications.

Figure 5:
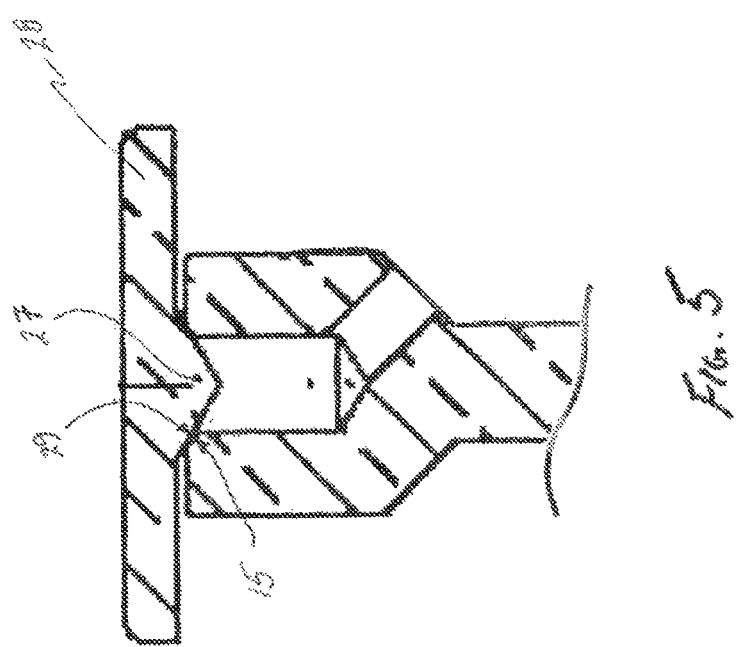
FIG. 5 is a cross section view of the interaction between the seal member and piston pusher of FIGS. 2-4.

FIG. 5 is a cross-section view of an exemplary seal plate embodiment of the previously described seal member 28. As can be seen, the seal plate includes a projection portion 27 which is centrally disposed on one side of the plate. The projection portion 27 may thus be received within the pusher recess 26 of the piston pusher 14 when the plate engages the piston pusher.

In the illustrated embodiment, the projection portion 27 takes the form of a cone and is configured so that the angled surface 29 of the projection portion 27 engages a corner of the upper rim 15 of the piston pusher 14. Although a conical shaped surface is shown, the projection portion 27 can instead include a spherical shaped surface. This configuration (conical or spherical shaped projection portion 27) results in line contact engagement between the seal plate 28 and the piston pusher 14 which enhances the sealing capability of the arrangement.

Figure 6:
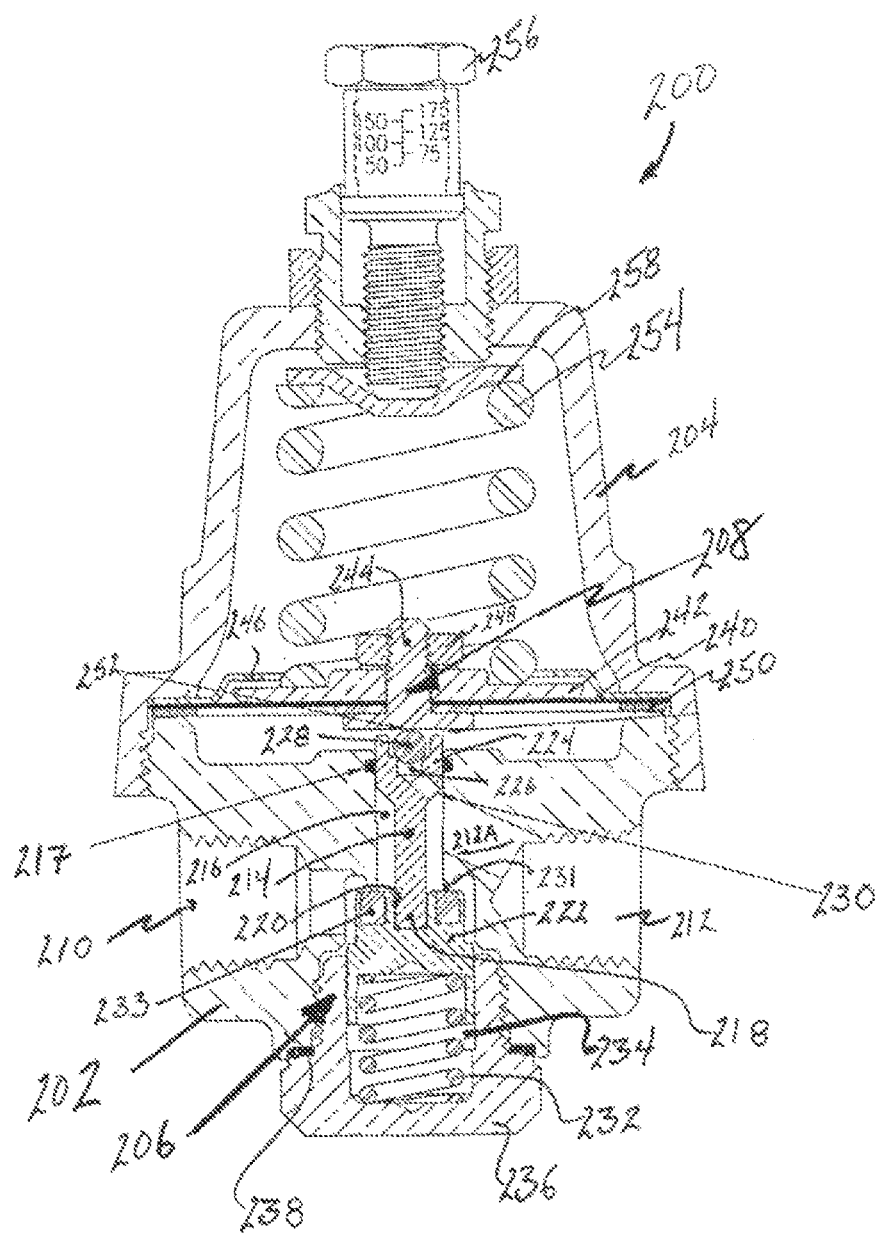
FIG. 6 is a cross-section view of an alternative embodiment of the disclosed valve.
Figure 7:
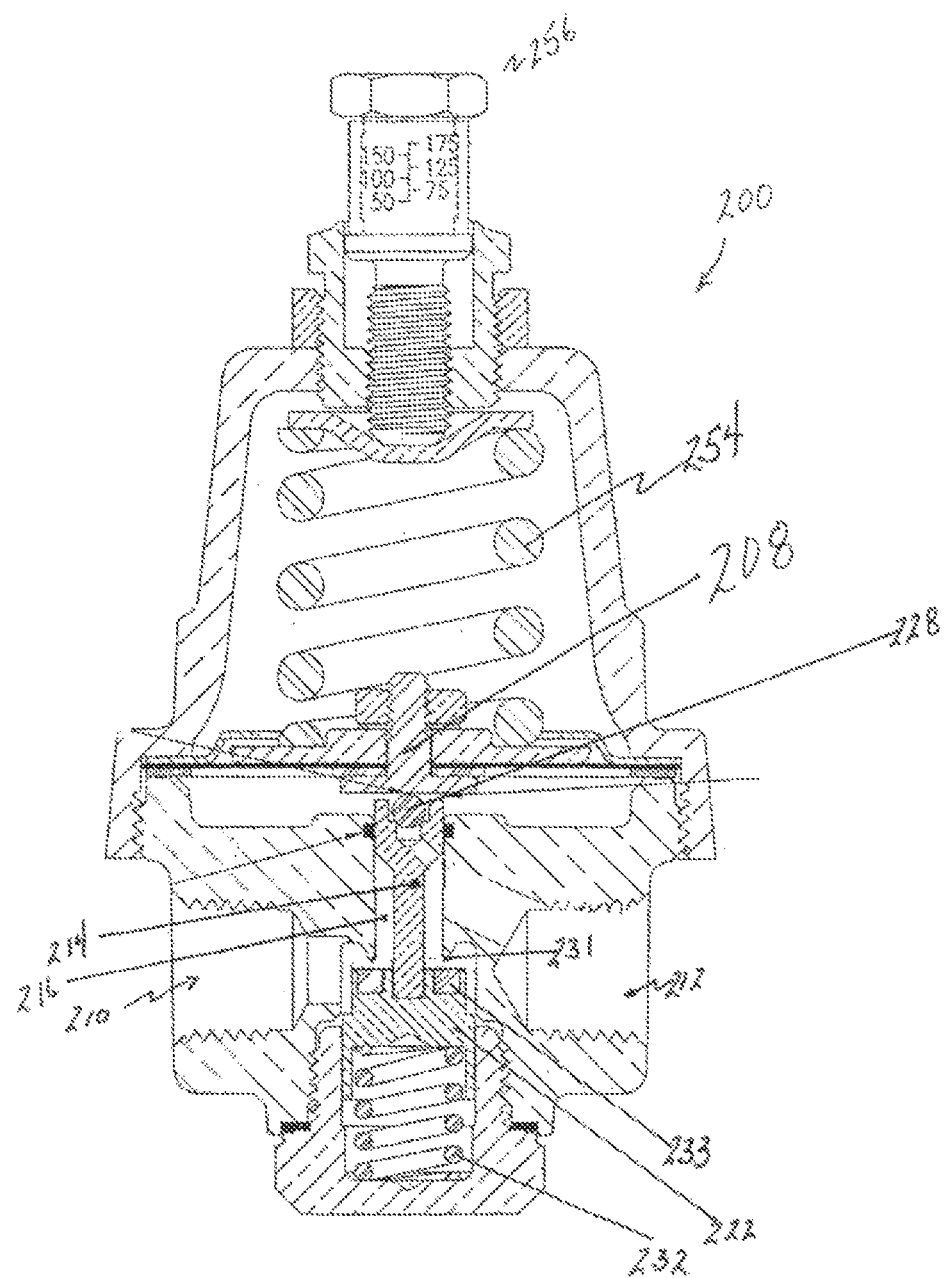
FIG. 7 is a cross-section view of the valve of FIG. 6 illustrating a pressure build operating configuration.
Figure 8:
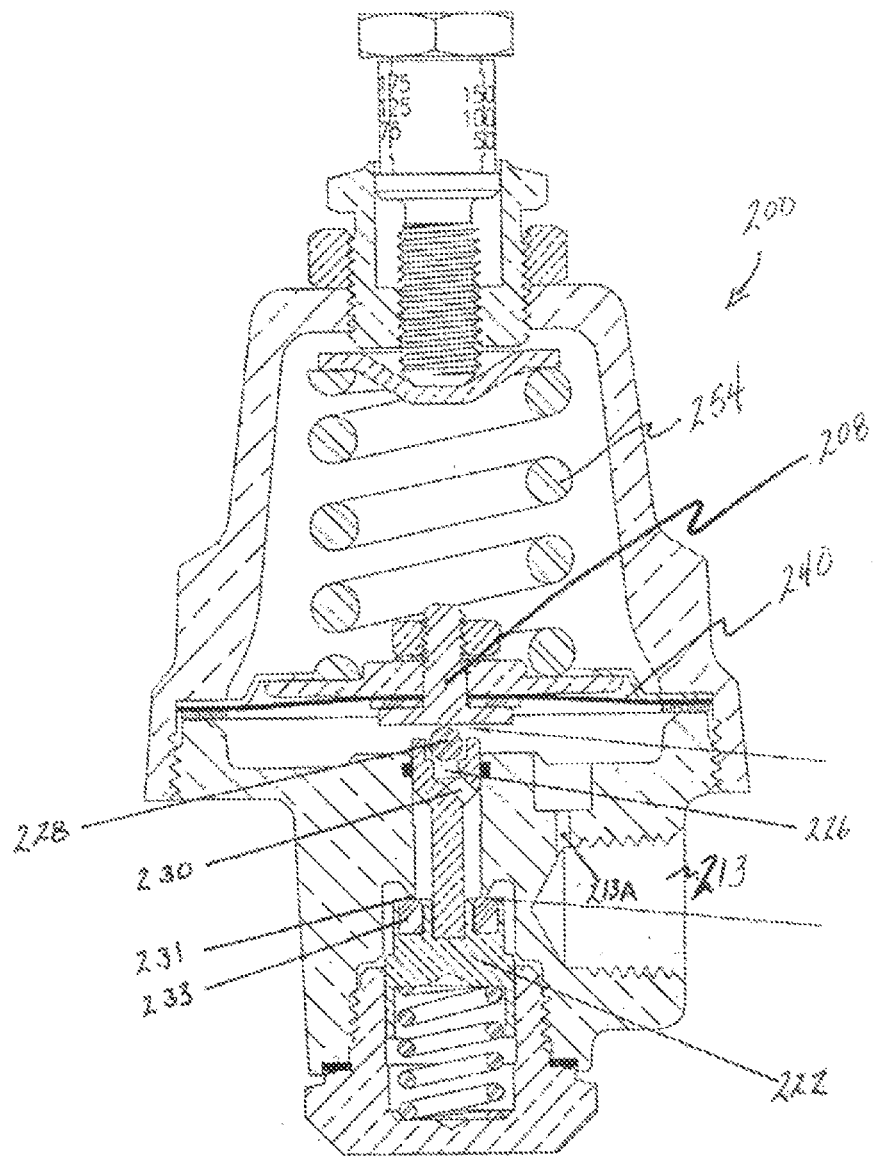
FIG. 8 is a cross section view of the valve of FIG. 6 rotated 90-degrees, illustrating an economizer operating configuration.

Referring now to FIGS. 6-8, an embodiment of the disclosed economizer valve 100 including an alternative seal member 128 will be described. As can be seen, valve 100 is substantially similar to valve 1 described in relation to FIGS. 1-5, with certain differences which will be described. Thus, valve 200 comprises a body 202, a bonnet 204, a piston pusher assembly 206 disposed in the body 202, and a diaphragm assembly 208 disposed in the bonnet 204. The body 202 also includes a first port 210 connected to the liquid 110 portion of the cylinder 100, a second port 212 connected to the gas layer 140 above the liquid, and a third port 213 (see FIG. 8) connected to the gas withdrawal valve 190 (FIG. 1). The body 202 and bonnet 204 are connected to each other via a threaded connection.

The piston pusher assembly 206 comprises a piston pusher 214 slidably disposed within a vertically oriented bore 216 in the body 202. A first end 218 of the piston pusher 214 is received within a recess 220 in a piston 222, while a second end 224 comprises a pusher recess 226 that cradles a seal member 228, which in the illustrated embodiment is a ball member. The pusher recess 226 further includes a side bore 230 that provides media communication between the pusher recess 226 and the vertically oriented bore 216. The piston pusher 214 is sealed to the bore 216 via an o-ring 217.

The piston 222 and the piston pusher 214 are biased upward toward a seat region 231 of the body 22 via a spring 232 disposed in a spring bore 234 formed in a body plug 236 which itself is threaded into the bottom of the body 202. An annular disc 233 is set into the piston 222 and biased into engagement with the seat region 231 of the body 202 via the force of the spring 232. In one embodiment, the disc 233 is burnished into the piston 222. Thus, in the illustrated configuration, the disc 233 contacts the seat region 231 to seal off the first port 210 from the vertically oriented bore 216 and the second port 212. The body plug 236 is sealed to the body 202 via a seal ring 238.

The diaphragm assembly 208 includes a diaphragm 240, diaphragm plate 242, diaphragm post 244, and diaphragm stop 246. The diaphragm post 244 is connected to the diaphragm plate 242 via a threaded nut 248. The diaphragm post and diaphragm 240 are sandwiched between a retaining washer 250 and the diaphragm stop 246, which, in turn, are sandwiched between opposing surfaces of the body 202 and bonnet 204. In this arrangement, a flat bottom face 252 of the diaphragm post 244 is presented to a surface of the seal member 228 which is held by the piston pusher 214 in the manner previously described.

The diaphragm assembly 208 is biased downward by a spring 254, the compression of which is adjustable via a tension screw 256 which is threadably mounted to the top of the bonnet 204. The tension screw 256 engages one end of the spring 254 via a plate 258, to control the set point of the valve 200 (i.e., the pressure at which the valve will switch from the pressure build function to the economizer function). The opposite end of the spring 254 engages an upper surface of the diaphragm plate 242 to bias the diaphragm plate 242 toward the piston pusher 214 and seal member 228.

As noted, the valve 200 is configured to perform both pressure build and economizer functions. FIGS. 7 and 8 show the internal configuration of the valve when performing each of these functions. Thus, FIG. 7 shows the valve 200 in the "pressure build" configuration, while FIG. 8 shows the valve 200 in the "economizer" configuration.

As can be seen in FIG. 7, the force of the spring 254 on the diaphragm assembly 208 presses down on the seal member 228 and piston pusher 214. This, in turn, presses down on the piston 222 and unseats the disc 233 from the seat region 231. In this configuration, the first and second ports 210, 212 are in media communication via the vertically oriented bore 216 in the body 2. Thus, a path is provided between the liquid 110 and the gas layer 140 of the tank (FIG. 1). As liquid flows through the tubing to the tank top it vaporizes, expanding and building pressure. This enables the system to maintain a desired gas pressure (sometimes referred to as the "pressure build shutoff pressure") above the liquid. This pressure build shutoff pressure may be slightly greater than that of the outlet gas pressure for reasons previously described in relation to the valve 1 of FIGS. 2-4.

Thus, when the pressure in the first port 210 and the vertically oriented bore 216 approach the pressure build shutoff pressure, the force of spring 254 is counteracted by the fluid force acting on the underside of the diaphragm 240 via bore 213A. As the pressure on the underside of the diaphragm 240 nears the shutoff pressure, the piston pusher 214 rises along with the piston 222 until the disc 233 engages the seat region 231 of the body, shutting off flow between the first port 210 and the second port 212.

If the pressure in the gas layer 140 drops below the pressure build shutoff pressure (e.g., due to substantial gas withdrawal), the force of spring 254 presses the piston 222 and disc 233 downward, unseating the disc 233 from the seat region 231, and enabling flow between the first and second ports 210, 212 to thereby raise the pressure of the gas layer 140 above the liquid 110. This process repeats to maintain the desired pressure above the liquid.

As previously noted, during idle periods where little or no gas is withdrawn via the gas withdrawal valve 190, there is a tendency for the system pressure to rise above the pressure build shutoff pressure. This rise in system pressure can be caused by, for example, heat transfer from the ambient surroundings that vaporizes small quantities of liquefied gas. When gas is withdrawn from the system under such an "overpressure" condition, the valve 200 is configured so that gas is initially taken from the gas layer 140 at the top of the cylinder 100 to quickly return the system pressure to at or near the pressure build shutoff pressure. Once the system pressure has been suitably reduced, the economizer function of the valve 200 shuts off and gas is thereafter produced by pulling from the liquid 110 in the cylinder 100.

FIG. 8 shows the valve 200 configured for drawing gas from the gas layer 140 when the system pressure is above the pressure build shutoff pressure. Initially the diaphragm assembly 208 is in the deflected condition, in which the gas pressure beneath the diaphragm 40 is sufficient to compress the spring 254 and enable the seal member 228 to "float" above the piston pusher recess 226. Thus, as gas is drawn from the third port 213, gas flows from the second port 212 (again, taking from the gas layer 140 in the cylinder), through second intermediate port 212A, through the side bore 230 of the piston pusher 214, and through third intermediate port 213A. This occurs until the pressure of gas layer 140 begins to drop (due to the withdrawal of gas directly from the gas layer). As the pressure of the gas layer drops, the spring 254 begins again to move downward, impinging on the seal member 228, and pressing piston pusher 214 and piston 222 down. This motion causes the seal member 228 to seal the piston pusher recess 226, which prevents further flow between the second and third ports 212, 213 (i.e., gas ceases to be drawn directly from the gas layer 140). It also causes the disc 233 to unseat from the seat region 231, reestablishing flow from the first port 210 (which is connected to the liquid 110) to the second port 212 (which is connected to the gas layer 140).

Thus, the flow path of the economizer is closed during the pressure build operation when seal member 228 of the piston pusher post 214 engages the diaphragm post 244 of the diaphragm assembly 28. Economizer flow only occurs when the disc 233 has seated and the diaphragm 240 continues to rise with increased pressure above the pressure build shut off pressure. This eliminates pressure build and economizer function overlap and provides a controlled opening pressure (adjustable active economizer) for the economizer.

The economizer flow initiation set point (which is the same as the pressure build shutoff pressure) is adjustable, and it does not overlap the pressure build function which can reduce the pressure build capacity of the system. The disclosed valve 200 is well suited for both high and low gas usage applications.

One additional advantage of the disclosed valve 1, 200 is that it can prevent the reverse flow of liquid through the Economizer port during cylinder fill operations. Reverse flowing liquid through the economizer during the filling process will flash to gas in the top of the tank and create a pressure increase in the tank that can negatively impact the smooth flow of liquid into the tank. The valve will not allow reverse flow of liquid through the economizer because the seal member 28, 228 will check the reverse flow from the third port 13, 213 to the second port 12, 212.

The individual components of the disclosed may be constructed of any of a variety of materials appropriate for the intended application, taking into consideration the temperature and pressure ratings of the application, as well as the operating fluid. In an exemplary embodiment, the body and bonnet may be constructed of bronze. The springs may be constructed of steel or stainless steel. Internal components may be constructed of stainless steel, bronze and/or brass. Sealing components such as o-rings, seal members (disc, ball, etc), seal rings, and discs, as well as diaphragms, may be made from any of a variety of metal, plastic or elastomeric materials suitable for the temperature and media used in a particular application. In one embodiment, the disc is made from polytetrafluoroethylene (Teflon).

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A pressure build economizer valve for a cryogenic liquid and gas supply system including a cylinder holding a liquefied gas and a gas, and a gas withdrawal valve for dispensing gas from the cylinder, the pressure build economizer valve comprising:

a body defining a first port in communication with the liquefied gas in the cylinder, a second port in communication with the gas in the cylinder, and a third port in communication with the gas withdrawal valve;

a piston assembly movable between a first position in which flow is permitted between the first port and the second port and the third port is substantially isolated, a second position in which flow between any of the first port, the second port, and the third port is substantially inhibited, and a third position in which flow is permitted between the second port and the third port and the first port is substantially isolated;

a first biasing element biasing the piston assembly toward the first position; and a second biasing element biasing the piston assembly toward the second position.

2. The pressure build economizer valve of claim 1, wherein the piston assembly includes:

a piston disposed within the body and arranged to selectively inhibit communication with the first port, the piston movable between a sealed positioned so that communication with the first port is inhibited, and an unsealed position in which communication with the first port is permitted;

a seal member positioned within the body; and a piston pusher disposed within the body and defining a side bore, the piston pusher defining a first end adjacent the piston and a second end adjacent the seal member, the piston pusher movable between a first position in which the piston is in the sealed position and the piston pusher is extended, and a second position in which the piston is in the unsealed position and the piston pusher is retracted.

3. The pressure build economizer valve of claim 2, wherein when the piston assembly is in the first position, the piston is in the unsealed position, the piston pusher is in the retracted position, and the seal member is sealed to the piston pusher so that flow through the side bore of the piston pusher is inhibited;

wherein when the piston assembly is in the second position, the piston is in the sealed position, the piston pusher is in the extended position, and the seal member is sealed to the piston pusher so that flow through the side bore of the piston pusher is inhibited; and wherein when the piston assembly is in the third position, the piston is in the sealed position, the piston pusher is in the extended position, and the seal member is not sealed to the piston pusher so that flow is permitted between the second port and the third port through the side bore of the piston pusher.

4. A pressure build economizer valve for a cryogenic liquid and gas supply system including a cylinder holding a liquefied gas and a gas, and a gas withdrawal valve for dispensing gas from the cylinder, the pressure build economizer valve comprising:

a body defining a first port in communication with the liquefied gas in the cylinder, a second port in communication with the gas in the cylinder, and a third port in communication with the gas withdrawal valve, the body further defining a bore connecting the first port to the second port, and a seat region defined about the bore;

a piston disposed within the body and arranged to selectively inhibit communication between the first port and the second port, the piston movable between a sealed position in which the piston seals against the seat region so that communication between the first port and the second port is inhibited, and an unsealed position in which communication between the first port and the second port is permitted; and a piston pusher disposed within the bore and defining a side bore, the piston pusher defining a first end adjacent to the piston and a second end adjacent to a seal member, the piston pusher movable between a first position in which the piston is in the sealed position, and a second position in which the piston is in the unsealed position, the pressure build economizer valve arranged in a pressure build configuration when flow passes between the first port and the second port and the third port is substantially isolated, the pressure build economizer valve arranged in a sealed configuration when flow is inhibited between any of the first port, the second port, and the third port, and the pressure build economizer valve arranged in an economizer configuration when the first port is substantially isolated.

5. The pressure build economizer valve of claim 4, and further comprising a spring biasing the seal member toward a downwardly deflected position.

6. The pressure build economizer valve of claim 5, wherein the spring provides a force that is adjustable.

7. The pressure build economizer valve of claim 4, wherein the piston includes a disk that seals against the seat region.

8. The pressure build economizer valve of claim 4, and further comprising a piston spring that biases the piston toward the sealed position.

9. The pressure build economizer valve of claim 4, wherein the piston pusher defines a pusher recess adjacent the second end, the side bore communicating with the pusher recess.

10. The pressure build economizer valve of claim 9, wherein the seal member arranged to engage and seal against the pusher recess.

11. The pressure build economizer valve of claim 9, wherein the seal member includes a plate with a projection portion at least partially receivable within the pusher recess.

12. The pressure build economizer valve of claim 11, wherein the projection portion includes a conical or spherical surface configured to engage a corner of an upper rim of the piston pusher surrounding the piston pusher recess.

13. The pressure build economizer valve of claim 4, and further comprising a diaphragm positioned between a bonnet and the body and movable between a downwardly deflected position, a non-deflected position, and an upwardly deflected position; a first spring positioned to bias the diaphragm toward the seal member; and a second spring positioned to bias the piston pusher and the seal member toward the diaphragm.

14. The pressure build economizer valve of claim 4, and further comprising a diaphragm positioned between a bonnet and the body and movable between a downwardly deflected position, a non-deflected position, and an upwardly deflected position; and wherein the diaphragm is moved in response to a pressure in the third port.

15. The pressure build economizer valve of claim 4, and further comprising a diaphragm positioned between a bonnet and the body and movable between a downwardly deflected position, a non-deflected position, and an upwardly deflected position; and wherein the diaphragm is moved in response to a pressure in the first port.

16. The pressure build economizer valve of claim 4, wherein when in the pressure build configuration, the piston is in the unsealed position, the piston pusher is in the second position, and the seal member is sealed to the piston pusher so that flow through the side bore of the piston pusher is inhibited.

17. The pressure build economizer valve of claim 4, wherein when in the sealed configuration, the piston is in the sealed position, the piston pusher is in the first position, and the seal member is sealed to the piston pusher so that flow through the side bore of the piston pusher is inhibited.

18. The pressure build economizer valve of claim 4, wherein when in the economizer configuration, the piston is in the sealed position, the piston pusher is in the first position, and the seal member is not sealed to the piston pusher so that flow is permitted between the second port and the third port through the side bore of the piston pusher.

* * * * *